United States Patent Office 2,789,891
Patented Apr. 23, 1957

2,789,891

GASOLINE FUEL SYSTEM CONDITIONER

Oliver L. Brandes, Gibsonia, and Charles B. Pattinson, Jr., Oakmont, Pa., assignors to Gulf Research & Development Company, Pittsburgh, Pa., a corporation of Delaware No Drawing. Application August 24, 1953, Serial No. 376,258

4 Claims. (Cl. 44—53)

This invention relates to a gasoline fuel system conditioner and to improved motor fuels containing the same.

The gasoline fuel system conditioner of our invention is multifunctional in that it not only prevents operational difficulties such as freezing out of moisture in fuel systems and corrosion of metal resulting from the presence of moisture in the fuel or in the air which supports combustion of the fuel, but also it reduces the amount of gum, lacquer, and carbonaceous deposits which may already be present in an engine.

As a result of less than optimum conditions of combustion in the operation of internal combustion engines, carbonaceous materials comprising carbon, gum, lacquer, etc., are deposited on cylinder walls, on piston heads, on the valves and on the spark plugs. These deposits eventually build up to such an extent that the rings and/or valves stick and the spark plugs misfire. Improved methods of refining motor fuels have greatly reduced the amount of carbon and gum which is formed in an engine, but complete elimination of the deposits is practically impossible. Carbon-free operation is dependent not only upon the fuel but also upon perfect engine performance. Because of the variety of conditions under which engines are operated, many of the conditions being adverse to perfect engine performance, carbonaceous deposits are inherently formed. When these deposits have built up to such an extent that engine operation becomes uneconomical or when the engine fails to operate at all, costly mechanical repairs are required to recondition the engine.

Incorporation of the gasoline fuel system conditioner of our invention in a motor fuel has the desirable characteristic in that it eliminates or substantially reduces engine stalling which normally occurs as the result of ice formation in the carburetor. Moisture may be introduced into the carburetor by gasoline which has become contaminated with water either in transfer, in storage or in use. On humid days, a considerable amount of moisture is drawn into the carburetor of the engine with the air used to support combustion. When the gasoline vaporizes in the presence of the moist air, the air is cooled to such an extent that the moisture condenses out and, not too infrequently, ice formation takes place. The formation of ice restricts the fuel passage and thus gives improper fuel to air ratios resulting in engine stalling. In this connection, the gasoline fuel system conditioner of our invention serves as an anti-freeze agent, as well as in reducing or preventing the freezing-out of moisture in other parts of the fuel system (e. g., fuel lines, fuel tanks, etc.).

In addition to the freezing problem encountered when water is present, water in the gasoline has the further disadvantage in that it leads to the corrosion of metals with which it comes in contact. We have found that the gasoline fuel system conditioner of our invention serves the further useful purpose of inhibiting corrosion of metal which would normally occur when gasoline containing water comes in contact with such corrodible metals.

The gasoline fuel system conditioner of our invention has a further surprising characteristic in that it reduces the octane number requirement of gasoline engines. The knocking tendency of an engine or its octane number requirement generally becomes greater with use. While the reason for the increase in the octane number requirement has not been definitely established, it is believed to be the result of the deposit of inorganic materials on the walls of the combustion chamber. The octane number requirement of an engine generally increases until an equilibrium octane requirement is reached. We have found that an engine operating with a gasoline containing the gasoline fuel system conditioner of our invention has an equilibrium octane number requirement considerably lower than an engine operating with only the base gasoline.

The motor fuel to which the gasoline fuel system conditioner is added may comprise a mixture of hydrocarbons boiling in the gasoline boiling range. The motor fuel may contain between 0.1 and 5.0 percent by volume, based on the fuel, of the gasoline fuel system conditioner. The gasoline may contain conventional antiknock and antioxidant agents without deleteriously affecting the beneficial effects of the gasoline fuel system conditioner.

The gasoline fuel system conditioner of our invention consists essentially of a homogeneous mixture of a light lubricating oil, an aliphatic alcohol, an aliphatic ketone and an ester of an aliphatic acid.

The lubricating oil is used to impart lubricity to the composition. The oil may be derived from a paraffinic, naphthenic, or mixed base crude, or the oil may be a synthetic oil having a viscosity within the range of a mineral oil of lubricating grade. If desired, a blend of oils of suitable viscosity may be employed instead of a single oil. The lubricating oil employed in the composition of the present invention is advantageously one having a viscosity between about 50 and about 2000 SUS at 100° F. An oil which has given particularly good results is a Texas oil having a viscosity of about 100 SUS at 100° F. and about 40 SUS at 210° F. The lubricating oil component of the fuel system conditioner comprises between about 1 and about 30 percent by volume of the total composition.

The aliphatic alcohols employed are advantageously those having the property of being water soluble. Accordingly, the lower molecular weight alcohols are more satisfactory than alcohols having higher molecular weights. The alcohols which are particularly advantageous are those boiling below about 350° F. and particularly those having from one to six carbon atoms in the molecule. We have found that the lower molecular weight alcohols have an important advantage over the alcohols having more than six carbon atoms in that compositions in which the lower molecular weight alcohols are incorporated are faster acting than compositions containing the higher molecular weight alcohols.

Exemplary of the alcohols which can be used in the composition of the invention are methanol, ethanol, 1-propanol, 2-propanol, 1-butanol, 2-methyl-1-propanol, 2-butanol, 2-methyl-2-propanol, 1-pentanol, 2-pentanol, 3-methyl-1-butanol, 2,2-dimethyl-1-propanol, 3-pentanol, 3-methyl-2-butanol, 2-methyl-2-butanol, 2-methyl-1-pentanol, 3-methyl-1-pentanol, 4-methyl-1-pentanol, 2-ethyl-1-butanol, 2,2-dimethyl-1-butanol, and the like. Methanol is particularly advantageous for use in the fuel system conditioner of this invention because of its excellent anti-freeze property. Methanol, however, is not readily soluble in oil. Accordingly, we advantageously employ at least an equal volume of a higher molecular weight alcohol in conjunction with the methanol in order to produce an oil-alcohol mixture which is homogeneous. Particularly good results have been obtained when a mixture of methanol and 2-propanol was used. If desired, of course, higher molecular weight alcohols could be used instead of the 2-propanol. Also, the 2-propanol could be replaced by ethanol. The volumetric ratio of methanol to the higher molecular weight alcohol is advantageously between about 1:1 and 1:2. The total alcohol content of the composition of the present invention comprises between about 30 and about 80 percent by volume of the total composition.

The aliphatic ketones employed in the composition of the present invention are those boiling below about 350° F. and particularly those containing from three to eight carbon atoms in the molecule. Examples of the ketones within this class are acetone, methyl ethyl ketone, methyl n-propyl ketone, isopropyl methyl ketone, diethyl ketone, methyl-n-butyl ketone, isoamyl methyl ketone, ethyl-n-propyl ketone, ethyl isobutyl ketone, amyl methyl ketone, ethyl butyl ketone, dipropyl ketone, hexyl methyl ketone, and amyl ethyl ketone. The amount of the ketone component of the gasoline fuel system conditioner of the present invention comprises between about 5 and about 25 percent by volume of the total composition.

The ester of an aliphatic acid which is used in the gasoline fuel system conditioner of the present invention is the compound which is prepared when an alcohol and an organic acid are reacted in such a manner as to eliminate water. The esters which are useful are those having a boiling point below about 350° F. Naturally, when a low molecular weight organic acid is used in the formation of the ester, a high molecular weight alcohol can be used and, conversely, when a high molecular weight acid is used a low molecular weight alcohol is used. For example, when the acid used is formic acid, the alcohol may be selected from the group consisting of methyl, ethyl, propyl, butyl, amyl, hexyl and heptyl alcohols. When n-heptanoic acid is used in the formation of the ester, the only alcohol which can be used to form an ester having a boiling point below about 350° F. is methyl alcohol. Examples of some of the esters which can be used are methyl formate, ethyl formate, methyl acetate, isopropyl formate, ethyl acetate, methyl propionate, n-propyl formate, isopropyl acetate, sec-butyl formate, isobutyl formate, ethyl propionate, n-propyl acetate, methyl n-butyrate, n-butyl formate, ethyl isobutyrate, sec-butyl acetate, isobutyl acetate, methyl isovalerate, ethyl n-butyrate, n-propyl propionate, isoamyl formate, n-butyl acetate, isopropyl n-butyrate, methyl n-valerate, n-amyl formate, ethyl isovalerate, isobutyl propionate, isoamyl acetate, n-propyl n-butyrate, n-butyl propionate, ethyl n-valerate, n-amyl acetate, isobutyl isobutyrate, methyl n-caproate, ethyl lactate, isobutyl n-butyrate, isoamyl propionate, cyclohexyl formate, n-butyl n-butyrate, ethyl n-caproate, n-propyl n-valerate, n-propyl carbonate, methyl n-heptoate, cyclohexyl acetate, and the like.

We have found that the esters boiling below about 350° F. have an important advantage over the higher boiling esters in that compositions in which the lower boiling esters are incorporated are faster acting than compositions containing higher boiling esters. The amount of the ester of an aliphatic acid which is used in the gasoline fuel system conditioner of the present invention comprises between about 5 and about 25 percent by volume of the total composition.

In addition to a light lubricating oil, an aliphatic alcohol, an aliphatic ketone and an ester of aliphatic acid, the gasoline fuel system conditioner of the present invention may also contain one or more of the so-called "additive" agents such as a metal deactivator, an oiliness agent, a foam inhibitor, an anti-knock improver, a corrosion inhibitor, an oxidation inhibitor, a dye, etc. Examples of metal deactivators which can be used are N,N'-disalicylal-1,2-diamino ethane, N,N'-disalicylal-1,2-diamino propane, and N,N'-disalicylal-1,2-diamino butane. Oxidation inhibitors may include alkylated phenols such as 2,4,6-tri-tert-butylphenol, 2,6-di-tert-butyl-4-methylphenol and bis(2 - hydroxy - 3 - tert - butyl - 5 - methylphenyl)methane. Oiliness agents may comprise esters of fatty acids such as butyl stearate; methyl esters of oxidized wax acids; oxidation products of scale wax, amorphous wax and liquid petroleum hydrocarbons; fatty alcohols; chlorinated fatty acids; methyl ester of chlorostearic acid; and the like. If desired, an anti-rust agent such as a fatty amine salt of an alkyl phosphoric acid and particularly the cocoamine salt of 3-methylbutyl-2-ethylhexyl phosphoric acid may be used. In instances where one or more of the above so-called "additive" agents are used, the amount of said agent ordinarily does not exceed about 2.5 percent by weight based on the total weight of the composition.

The relative quantities of the various constituents in the gasoline fuel system conditioner of our invention may be varied within certain limits without deleteriously affecting the beneficial effects and desirable properties of the composition. A tabulation of the approximate maximum and minimum amounts of constituents used in preparing the preferred compositions is as follows:

| Constituents | Percent by Volume | |
| --- | --- | --- |
| | Maximum | Minimum |
| Lubricating oil | 30 | 1 |
| Aliphatic alcohol | 80 | 30 |
| Aliphatic ketone | 25 | 5 |
| Ester of an aliphatic acid | 25 | 5 |
| "Additive" agents | [1] 2.5 | 0 |

[1] Percent by weight based on the total weight of the other constituents.

The amount of the gasoline fuel system conditioner which is required to remove carbonaceous deposits may vary depending on the condition of the engine, the particular fuel used, the amount of water in the fuel, the amount of moisture in the air and the operating conditions of the engine. Ordinarily, it is not necessary to employ more than about one percent of the composition based on the volume of the motor fuel. While five percent or more can be used without harmful results, improved results can be obtained when the composition is used in an amount between about 0.1 and about 3.0 percent, based on the volume of the motor fuel. We prefer to incorporate between about 0.5 and 3.0 milliliters of the fuel system conditioner in 100 milliliters of gasoline. When the composition is added to the motor fuel, excellent results have been obtained by adding about 12 ounces of the fuel system conditioner to each 10 gallons of gasoline.

If the engine which is being subjected to treatment has valves which are sluggish and are subject to incipient sticking, it is preferred to add about 12 ounces of the gasoline fuel system conditioner directly to the carburetor by slowly introducing the composition into the air intake while the engine is running at a fast idle. A further method of utilizing the gasoline fuel system conditioner of the invention comprises adding from about one to about two ounces of the composition to each cylinder through the spark plug ports. When the latter procedure is employed it is preferable to allow the engine to remain idle for a short time, about 10 to about 20 minutes, and then, after replacing the spark plugs, run the engine with intermittent acceleration for a time sufficient to remove the composition. The exact time required will vary depending upon the condition of the engine.

Typical examples of gasoline fuel system conditioners within the scope of the invention are as follows:

| Composition | Percent by Volume | |
|---|---|---|
| | A | B |
| Light lubricating oil | 20 | 20 |
| Isopropyl alcohol | 35 | 35 |
| Methyl alcohol | 20 | 20 |
| Ethyl acetate | 15 | 15 |
| Methyl ethyl ketone | 10 | 10 |
| "Additive" agents | 0 | [1] 2.055 |

[1] Percent by weight based on the total weight of the other constituents.

| "Additive" Agents | Percent by Weight |
|---|---|
| N,N'-disalicylal-1,2-diamino propane | 0.75 |
| 2,6-di-tert-butyl-4-methylphenol | 0.50 |
| Butyl stearate | 0.50 |
| Cocoamine salt of 3-methylphenyl-2-ethylhexyl phosphoric acid. | 0.30 |
| Oil-soluble dye | 0.005 |

The lubricating oil used in preparing the above compositions has the following typical properties:

Gravity, °API _____ 24.5
Viscosity, SUV, Sec.:
  100° F _____ 106
  210° F _____ 38.3
Flash point, OC, ° F _____ 320
Fire point, OC, ° F _____ 355
Pour point, ° F _____ —60
Carbon residue, Conradson, percent _____ 0.02
Neutralization value (ASTM D974–51T) _____ 0.05

Typical properties of Composition B are as follows:

Gravity, °API _____ 38.8
Viscosity, kinematic, cs. at 100° F _____ 1.01
Flash point, TCC, ° F _____ Below +40
Pour point, ° F _____ Below —65
Carbon residue, Conradson, percent _____ 0.02
Neutralization value (ASTM D974–51T) _____ 0.3
Saponification number (ASTM D94–48T) _____ 80.5
Ash, percent _____ 0.01

The gasoline fuel system conditioners of the present invention which are illustrated by Compositions A and B above have an important and surprising advantage over compositions containing high molecular weight alcohols and esters, in that compositions of the present invention dissolve automotive combustion chamber deposits faster than compositions which contain the high molecular weight compounds. To illustrate this surprising effect, Composition B above was compared with similar compositions wherein, in one instance, 10 percent of di-n-butylphthalate was used in place of an equal amount of the lubricating oil of Composition B (Composition C), and, in another instance, 10 percent of a technical grade of isooctyl alcohol replaced an equal amount of the lubricating oil of Composition B (Composition D).

The gum solvency properties of Compositions B, C and D were determined by contacting equal amounts of gum, which was formed from a raw gasoline distillate, with equal quantities of the compositions. The procedure consisted of adding 30 milliliters of the composition to a glass container in which had been placed 0.5 gram of gasoline gum. The contents of the container were then agitated and the time required to effect solution of the gum was recorded. Whereas Composition B required 2 minutes and 45 seconds to effect solution of the gasoline gum, Compositions C and D required 3 minutes and 55 seconds and 3 minutes, respectively. Thus, Composition B is faster acting than Compositions C and D by about 30 percent and 10 percent, respectively. The advantage of the compositions of the present invention, illustrated by Composition B, over Compositions C and D is thus self-evident. The speed with which the gasoline fuel system conditioner performs its function is particularly important where the composition is added directly through the carburetor air intake to free incipiently sticking valves.

In order to illustrate the decrease in octane requirement for an engine when operating with an improved gasoline in accordance with this invention, octane rating tests were made in a single-cylinder engine. The engine installation used was a modification of the standard ASTM assembly as described in the laboratory knock-rating test procedure CRC Designation F-1-545 and CRC Designation F-2-545. These tests are described in the CRC Handbook, 1946 edition, compiled by the Coordinating Research Council, Incorporated. The engine assembly was modified to the extent that the Waukesha CFR engine was equipped with an L-head cylinder instead of an overhead valve. In carrying out these tests, octane number requirements were recorded at the beginning of each test when the engine was clean and then periodically until the octane requirement had reached an equilibrium point. The following table sets forth the data obtained when the engine was operated with a reference gasoline and the same gasoline containing 34 milliliters of Composition B per gallon of gasoline.

| Hours of Operation | Engine Octane Requirement | |
|---|---|---|
| | Reference Gasoline | Reference Gasoline Containing 34 ml. of Composition B per Gallon of Gasoline |
| 0 | 55 | 55 |
| 25 | 62 | 74 |
| 50 | 75 | 76 |
| 75 | 77 | 79.5 |
| 100 | 82 | 80.5 |
| 125 | 85 | 80.5 |
| 150 | 85 | 77 |
| 175 | [1] 85 | 77 |

[1] Test discontinued at 160 hours.

The above data show that the equilibrium octane requirement of the single-cylinder CRF engine employed in the test was about 85 when operating with the reference gasoline and about 77 when operating with the reference gasoline containing 34 milliliters of Composition B per gallon of gasoline. Thus, the equilibrium octane requirement of the engine operating with the improved gasoline was about 8 numbers below the requirement of the same engine operating with unimproved gasoline.

While our invention is described above with reference to various specific examples and embodiments, it will be understood that the invention is not limited to such examples and embodiments and may be variously practiced within the scope of the claims hereinafter made.

We claim:

1. A gasoline fuel system conditioner consisting essentially of a homogeneous mixture of about 1 to about 30 percent by volume of a light mineral lubricating oil; about 30 to about 80 percent by volume of a mixture of methyl alcohol and isopropyl alcohol, the volumetric ratio of said methyl alcohol to said isopropyl alcohol being between about 1:1 and 1:2; about 5 to about 25 percent by volume of a saturated aliphatic ketone having a boiling point below about 350° F.; and about 5 to about 25 percent by volume of an ester of a saturated aliphatic acid, said ester having a boiling point below about 350° F.

2. A gasoline fuel system conditioner consisting essentially of a homogeneous mixture of about 1 to about 30 percent by volume of a light mineral lubricating oil; about 30 to about 80 percent by volume of a mixture of methyl alcohol and isopropyl alcohol, the volumetric ratio of said methyl alcohol to said isopropyl alcohol being between about 1:1 and 1:2; about 5 to about 25 percent by volume of methyl ethyl ketone; and about 5 to about 25 percent by volume of ethyl acetate.

3. A gasoline fuel system conditioner consisting essentially of a homogeneous mixture of about 20 percent by volume of a mineral lubricating oil having a viscosity between about 50 and about 2000 SUS at 100° F., about 20 percent by volume of methyl alcohol, about 35 percent by volume of isopropyl alcohol, about 10 percent by volume of methyl ethyl ketone and about 15 percent by volume of ethyl acetate.

4. A gasoline fuel system conditioner consisting essentially of a homogeneous mixture of about 20 percent by volume of a mineral lubricating oil having a viscosity between about 50 and about 2000 SUS at 100° F.; about 20 percent by volume of methyl alcohol; about 35 percent by volume of isopropyl alcohol; about 10 percent by volume of methyl ethyl ketone; about 15 percent by volume of ethyl acetate; and about 2 percent by weight, based on the total weight of the composition, of an additive group consisting of N,N'-disalicylal-1,2-diamino propane, 2,6-di-tert-butyl-4-methylphenol, butyl stearate, cocoamine salt of 3-methylphenyl-2-ethylhexyl phosphoric acid, and oil-soluble dye.

References Cited in the file of this patent

UNITED STATES PATENTS

| | | |
|---|---|---|
| 2,312,790 | Backoff et al. | Mar. 2, 1943 |
| 2,341,892 | Backoff et al. | Feb. 15, 1944 |
| 2,350,145 | Backoff et al. | May 30, 1944 |
| 2,548,347 | Caron et al. | Apr. 10, 1951 |
| 2,646,348 | Neudeck | July 21, 1953 |

FOREIGN PATENTS

| | | |
|---|---|---|
| 396,427 | Great Britain | Aug. 2, 1933 |

OTHER REFERENCES

Industrial and Engineering Chemistry (November 1952), page 2721.